United States Patent
Falcy et al.

(10) Patent No.: US 10,120,667 B2
(45) Date of Patent: Nov. 6, 2018

(54) SYSTEMS AND METHODS FOR DELIVERING AND ACCESSING SOFTWARE COMPONENTS

(71) Applicant: Schneider Electric Industries SAS, Rueil Malmaison (FR)

(72) Inventors: Mathieu Falcy, Grenoble (FR); Michel Moulin, Grenoble (FR)

(73) Assignee: Schneider Electric Industries SAS, Rueil Malmaison (FR)

( * ) Notice: Subject to any disclaimer, the term of this patent is extended or adjusted under 35 U.S.C. 154(b) by 0 days.

(21) Appl. No.: 14/701,315

(22) Filed: Apr. 30, 2015

(65) Prior Publication Data

US 2015/0317151 A1 Nov. 5, 2015

Related U.S. Application Data

(60) Provisional application No. 61/986,859, filed on Apr. 30, 2014.

(51) Int. Cl.
| | |
|---|---|
| *G06F 9/445* | (2018.01) |
| *G06F 8/60* | (2018.01) |
| *G06F 8/65* | (2018.01) |
| *H04L 29/08* | (2006.01) |
| *G06F 21/10* | (2013.01) |

(52) U.S. Cl.
CPC .............. *G06F 8/60* (2013.01); *G06F 8/65* (2013.01); *G06F 21/10* (2013.01); *H04L 67/10* (2013.01); *H04L 67/28* (2013.01); *H04L 67/34* (2013.01)

(58) Field of Classification Search
None
See application file for complete search history.

(56) References Cited

U.S. PATENT DOCUMENTS

| | | | | |
|---|---|---|---|---|
| 6,345,386 B1* | 2/2002 | Delo | ......................... | G06F 8/61 |
| | | | | 717/176 |
| 2008/0244057 A1 | 10/2008 | Kojima | | |
| 2011/0119664 A1* | 5/2011 | Kimura | ..................... | G06F 8/60 |
| | | | | 717/173 |

OTHER PUBLICATIONS

International Search Report dated Apr. 26, 2016 in counterpart PCT international application No. PCT/IB2015/001461 (5 pages).
(Continued)

*Primary Examiner* — Qamrun Nahar
(74) *Attorney, Agent, or Firm* — David V. Rossi; Haug Partners LLP

(57) ABSTRACT

A system, method, and computer program product are disclosed for enabling software components on a device, and for providing selective access to the components. A computer system receives a download request for a software component and an identifier associated with the requesting device and determines whether the software component is pre-installed, but not enabled, on the device. In the event that the system determines, through a registration check, that the software component is pre-installed but not enabled on the device, the system enables the component on the device. In the event that the system determines that the software component is not pre-installed on the device, the system causes the component to be downloaded and enabled on the device. Selective access to software components is granted based on whether the component is accessed by a user or a service provider, with the service provider granted access to remotely install ancillary functionality.

32 Claims, 13 Drawing Sheets

(56) References Cited

OTHER PUBLICATIONS

Written Opinion of the International Search Authority dated Apr. 26, 2016 in counterpart PCT international application No. PCT/IB2015/001461 (10 pages).

* cited by examiner

SYSTEMS AND METHODS FOR DELIVERING AND ACCESSING SOFTWARE COMPONENTS

RELATED APPLICATIONS

This application claims the benefit of U.S. Provisional Patent Application No. 61/986,859, filed Apr. 30, 2014, which is hereby incorporated herein by reference in its entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

BACKGROUND

This application relates generally to the delivering and accessing of software components including selecting, purchasing, provisioning, downloading, installing, configuring, managing, accessing, and controlling software.

More specifically, the application relates to providing systems and methods to streamline the download and installation process of software components based on certain criteria related to the user or user device. The application also relates to providing systems and methods to allow users to have selective access only to components installed and enabled on a user device while allowing a third party access to a full or fuller range of components or component data installed on or generated by a user device, based on certain criteria.

SUMMARY

The number of electronic devices connected to a private or public network, such as the Internet, now exceeds the number of humans on the planet and may include, e.g., computers, servers, printers, routers, hubs, mobile phones, tablet computers, televisions, portable audio players, medical devices, gaming consoles, home appliances, and other devices (hereinafter, simply "device" or "devices"). Similar examples are found in the commercial and industrial sectors.

For example, in an exemplary embodiment encompassing the power and electrical category (or electrical data or monitoring services), such devices may include, e.g., metering devices, controllers, intelligent electronic devices ("IEDs"), circuit breakers, and/or transformers (as above, hereinafter simply "device" or "devices"). In some embodiments, for example, a plurality of IEDs may be disposed at respective locations of an electrical system and interface with, or control or manage, other devices.

Any device, whether in the consumer, commercial, or industrial sector, may have software pre-installed or installed, either in the form of a single software package (or "component" or "application" or "app"), or in the form of two or more software components, which may be standalone components or modularized components. The rapid acceptance and deployment of devices and component software, however, presents a significant challenge for purchasers or users in the consumer, commercial, and industrial settings from the perspective of selecting, purchasing, provisioning, downloading, installing, configuring, and accessing a myriad of software components on a myriad of devices.

In particular, the management of these processes can be cumbersome and burdensome on an individual or entity tasked with such responsibilities. Traditional systems and methods may require a duplication of efforts, such as re-downloading a software component that has already been downloaded but not yet enabled on a device, thereby delaying the installation process and affecting the user experience. Similarly, traditional systems and methods may prevent selective or customized access to components or component data by various entities accessing a particular device, while also serving as a technical barrier to various methods of doing business, e.g., various purchase and/or licensing arrangements, or data services, e.g., cloud data services.

According to an embodiment, systems and methods are provided for streamlining the download and installation process of software components based on certain criteria, e.g., on whether or not a user device has certain components pre-installed, by either enabling pre-installed components on a user device, or by downloading and then installing or enabling components that were not pre-installed on the user device. Such a determination may be based on an inventory of software installed on the device, such as a local inventory stored on the device, or a cloud-based or cloud-stored inventory (hereinafter "cloud inventory").

In an embodiment, a user may initiate a download request for a component from, e.g., an online store or app store (hereinafter "app store") configured to sell or license software, or provide software under any other commercial or non-commercial mechanism such as a trial period, freeware, shareware, or open source offering (hereinafter referred to interchangeably as a "purchase" or "download").

In various embodiments, software components may be pre-installed by a manufacturer or distributor of a device, i.e., at the factory, but not enabled for use, while other components may be purchased and installed at a later time, e.g., through the app store. Alternatively, some of the components may be pre-installed by a manufacturer or distributor, but not enabled for use by the user until, e.g., a component is later purchased or otherwise downloaded by a user through the app store. Various configurations may allow a manufacturer or distributor of a device flexibility in configuring the number of components that a device includes at the time of shipment, while allowing for add-on and upsell options in the future to, e.g., update software, expand the capability of a device, or introduce new features, options, screens, and configurations.

In an embodiment, once a user initiates a download request from the app store, the store may determine whether the requested component is pre-installed on the requesting device, or on an endpoint device to ultimately receive the software if an intermediary device, e.g., a desktop computer, mobile device, tablet, or other device is used to initiate the download request. The app store, or an intermediary device or associated device or server, may determine whether the component is pre-installed on the requesting device by comparing information related to the component, e.g., a component ID or other unique identifier, to a database or inventory of installed components on that device. As discussed above, such an inventory may be stored in the cloud by, e.g., the app store, or may be stored locally on the device.

If a determination is made that the component is pre-installed on the device but not yet enabled for user access, the app store or an intermediary device may enable the component on the device, or send a signal or other authorization, e.g., a key, to the device to enable the component on the device. In such an embodiment, the step of downloading the software onto the device is avoided such that the user may have near instantaneous access to the component, improving the user experience while also preserving internet bandwidth. In some embodiments, the user may also be provided with access to historical information from the component, if the component had been running as a background process but not enabled for user access or user interaction.

In some embodiments, where a pre-installed component is enabled without the need for a download, the app store or device may check a firmware or version number of the component against a current version or desired version, and update the pre-installed component if necessary to bring the component into compliance with the latest version. In this embodiment, the user may benefit from near instantaneous access to the component while also preserving internet bandwidth, provided that the app store need only download a delta or difference file representing the updated portions of the component.

If a determination is made that the component is not pre-installed on the device, the app store may trigger the device to download the component and then enable the component, e.g., by sending a signal or other authorization.

According to some embodiments, a determination of whether to consult with a local inventory or cloud-based inventory may be based on whether a user has completed a registration process for a particular device. If a registration has been completed, the app store may have a cloud-based inventory of components installed on a particular device. If a registration has not been completed, the app store may trigger an inventory process locally on the device, which may either collect and report whether a particular component is installed, or may upload to the app store a complete registration or inventory, to be converted into a cloud-based inventory. In such an embodiment, future download requests from the device may be treated as though the device had completed a registration process, utilizing the full inventory. According to some embodiments, the cloud-based inventory may be refreshed at present intervals, or when the user completes a new purchase or download.

According to other embodiments, systems and methods are provided for allowing or granting selective access to components, or data generated by components, on a device. In an exemplary embodiment, user access on a device may be granted only to components installed and enabled on a user device, e.g., those purchased by the user, including data monitored, collected, aggregated, or generated by those components, while allowing a third party, e.g., a manufacturer, distributor, service provider, or other entity, access to a full or fuller range of components installed on the user device, e.g., components installed or pre-installed on the user device but not purchased by the user, including component data.

In an embodiment, access to a component or components, or data generated by those components, may be dependent on whether a user or device has purchased such components, or is entitled to receive services provided by a third party. For example, a device may have ten components pre-installed by, e.g., the device manufacturer. In one exemplary embodiment, a user may have purchased five components and be granted access to only those five components. In another exemplary embodiment, a user may have purchased five components and be granted access to only those five components, while a third party, e.g., a service provider, may have access to all ten components and data associated with those components.

According to one exemplary embodiment, a user may have purchased five components and be granted access to only those five components, while a third party, e.g., a service provider, may have access to all ten components and data associated with those components, plus other components or additional functions that can be downloaded to or enabled on the user's device by the service provider, without providing direct access to the user to these additional components. Such an embodiment may work in tandem with the systems and methods described above for determining whether the requested component is pre-installed on the requesting device, or on an endpoint device to ultimately receive the software if an intermediary device is used to initiate the download request, or if a component is not pre-installed on the device and must be downloaded and then enabled, e.g., by sending a signal or other authorization as discussed above in more detail.

Such embodiments may allow, e.g., a third party service provider to provide managed services on the devices, collect and retrieve data, monitor the devices, or provide other functionality and/or services to the user and/or device. Similarly, such an embodiment may allow the service provider to populate a fuller set of data on a web portal or other interactive portal or reporting and/or monitoring tool for access by the user or other entities.

DETAILED DESCRIPTION

Figure 1:
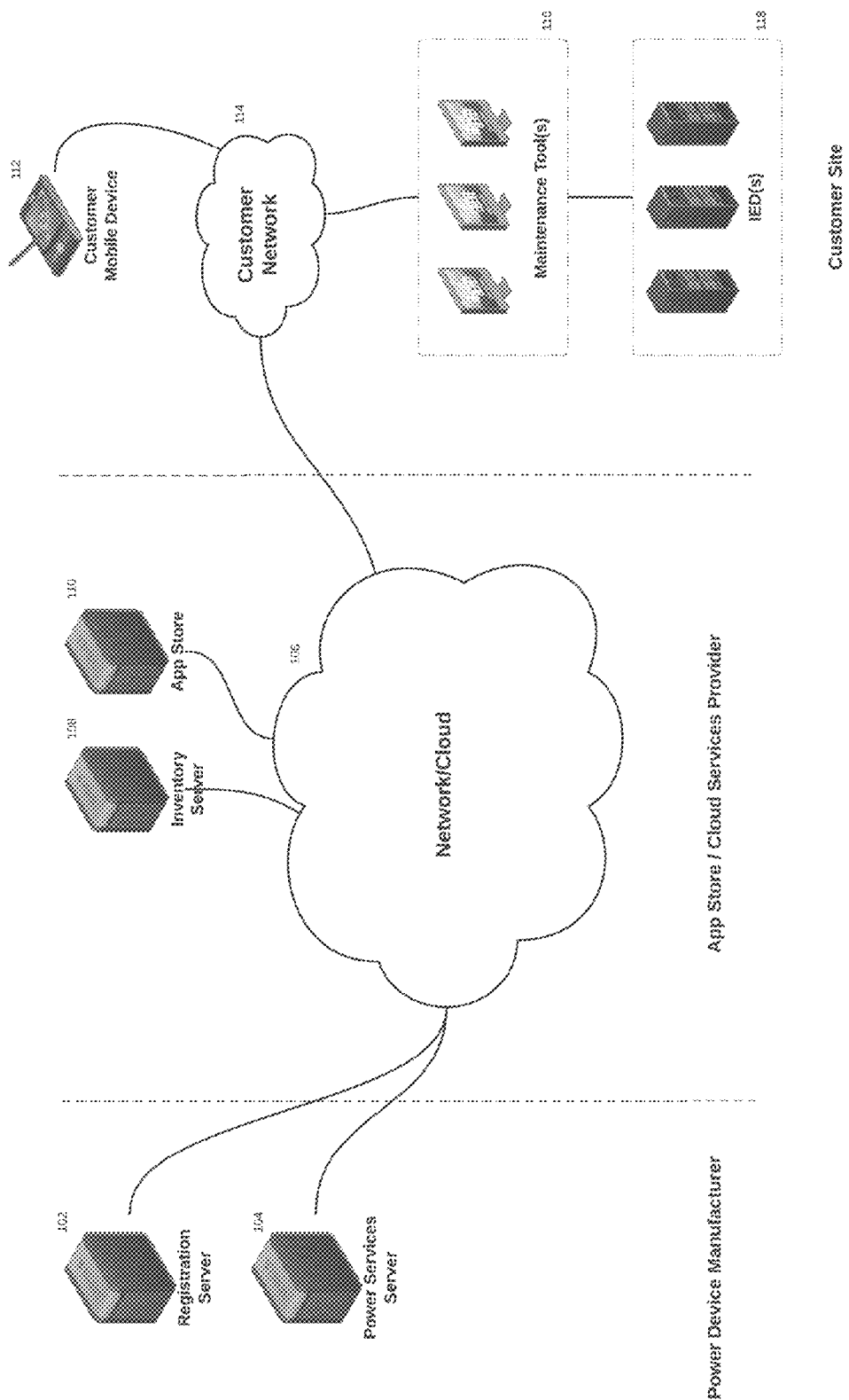
FIG. 1 depicts a block diagram of a cloud computer system according to some embodiments of the present invention.

FIG. 1 depicts a block diagram of a cloud computer system, or ecosystem, according to an illustrative embodiment of the invention in the power/electrical sector, and in particular for providing protection on electrical networks, e.g., via circuit breaker technology, and for the measurement and monitoring of electrical energy. Monitoring of electrical energy by consumers and providers of electric power is a fundamental function within any electric power distribution system.

For example, in addition to protection features, electrical energy may be measured or monitored for purposes of usage, equipment performance, power quality, and other factors. Electrical parameters that may be monitored include volts, amps, watts, vars, power factor, harmonics, kilowatt hours, kilovar hours, and any other power related measurement parameters. Typically, measurement of the voltage and current at a location within the electric power distribution system may be used to determine the electrical parameters for electrical energy flowing through that location.

According to various embodiments, other functions may be carried out in the functional categories of, e.g., protection, counting, diagnosis, maintenance, alarming, or other features. For example, functionality may relate to the number of open-close cycles, contacts erosion, or rms current cut by the breaker, etc.

An embodiment as depicted in FIG. 1, including software components or apps available from, e.g., an app store, may be particularly useful in light of the need for accurate energy information and to consolidate protection features, metering features, and communication features into one device or one or more interconnected devices. Such systems may, e.g., reveal where, when, how much energy is consumed and discover opportunities to improve efficiency, as well as providing traditional protection features. For example, energy data may allow a user to study consumption patterns; compare the performance of different facilities; isolate where energy is being wasted; expose energy costs at the building, department, or machine level; and validate utility billing for building owners or operators. The system of FIG. 1 may be employed by industrial buildings, commercial buildings, residential buildings, or even in mobile environments. For example, the system may be employed by, e.g., factories, process industries, power OEMs, industrial OEMs, data centers, hospitals, stores, offices, homes, or in mobile power delivery settings.

According to an embodiment, at a power device manufacturer or factory site or sites, a registration server 102 stores registration data related to customer devices such as maintenance tools 116 or IEDs 118. A maintenance tool 116 may be, for example a personal computer running one or more application programs such as an IED configuration and maintenance tool, while an IED 118 may be, for example, a power/energy device such as a circuit breaker device that may include a separate circuit breaker maintenance tool, which may be operable for implementing metering functionality as well as electrical protection functionality, as discussed in more detail below. Embedding said metering function into an IED may, e.g., avoid the costs and panel space of installing a separate power meter with, e.g., current transformers.

Maintenance tools 116 and IEDs 118 may be interconnected via customer network 114, via USB or other local connection (e.g., a wired or wireless connection), or remotely via Modbus TCP/Webservices or Modbus SL, or other short or long-range networking protocols.

Server 104 may comprise a power services server, or a server for electrical data or monitoring services in general (hereinafter "power services server" according to an embodiment). Power services server 104 may provide managed services, monitoring, and other functionality to customers of a power device manufacturer. Power services server 104 may be controlled by, for example the device manufacturer of, e.g., a maintenance tool 116, IED 118, or other third party service involved in, e.g., the power/electrical sector, the computer sector, or the device management sector in general. Power services server 104 may be a cloud server, or may interface with a web server to provide cloud-related services such as reporting or monitoring of power conditions through the cloud.

Inventory server 108 stores information related to components installed on customer devices, e.g., maintenance tools 116 or IEDs 118, such as a list of components, versions, and other details related to installed components at a customer site. App store 110 provides access to components available for purchase or license or other download, and may provide an interactive portal to users at a customer site or remote site, e.g., any network-connected site, to select, customize, purchase, license, preview, or download components. For example, maintenance tools 116 may be utilized to browse app store 110 through a web or interactive portal. App store 110 may be a public e-commerce site such as the Apple App Store, Google Play store, or Google Chrome web store, or may be a private app store, such as one maintained and operated by a device manufacturer, e.g., the operator of power services server 104.

Maintenance tools 116 or IEDs 118 at a customer site may be any device, including those devices capable of receiving and installing components from, e.g., app store 110. In the exemplary embodiment encompassing the power and electrical sector, as discussed above, such devices may include, e.g., metering devices, controllers, IEDs, circuit breakers, and/or transformers.

According to an embodiment, IEDs 118 comprise one or more devices that perform monitoring of electrical energy and that may be electro-mechanical devices such as, for example, a billing meter (e.g., residential, etc.), or other electronic device. Intelligent electronic devices, discussed in more detail below, typically include some form of a processor. In general, the processor is capable of using the measured voltage and current to derive measurement parameters and other parameters for, e.g., reporting. The processor may operate based on a software configuration configured by, e.g., a device manufacturer or power services server 104.

The software configuration of the IED may be instruction sets stored in the IED. The instruction sets may be software, firmware, or some other form of operating code and may include device specific data used to configure a particular IED. Typically, the base software configuration of an IED is determined during manufacturing. However, following installation of the IED in the field, additional site-specific data may be entered to complete or modify the configuration based on the operational functionality desired, together with or separate from the software components described herein available from, e.g., app store 110.

A typical consumer or supplier of electrical energy may have many IEDs installed and operating throughout their operations. The IEDs may operate individually, or may operate as part of a monitoring system. Each of the IEDs may require unique software configurations, or multiple devices may include the same software configuration.

In an exemplary embodiment wherein an IED 118 comprises an IED, the IED may be a programmable logic controller (PLC), a supervisory control and data acquisition system ("SCADA"), motor drives, inverters, a remote terminal unit (RTU), an electronic power meter, a protective relay, a fault recorder, or other similar intelligent device installed in the field and capable of monitoring electrical energy. In addition, the IED 118 may perform other functions such as, for example, power distribution system protection, management of power generation, management of energy distribution, and management of energy consumption. In one embodiment, the IED 118 includes a user interface, a processor, a memory and a communication port.

During operation of a power distribution system, the IED monitors the electrical energy flowing within. The IED may process the electrical energy to derive, store, and display data for various electrical parameters indicative of the electrical energy flowing in the conductors. The IED may also provide outputs to, and receive inputs from, the power distribution system. As will be hereinafter described, the software configuration within the IED may be modified remotely without removing the IED from service.

It will be appreciated that the IED may include other hardware components such as, for example, metering sensors, power supplies, signal processing circuits, logic circuits, or any other hardware useful in performing electrical energy monitoring. The protection features of an IED may operate independently of measurement and communication features so as to not jeopardize any critical features, although all functions may be tested and certified together.

An IED user interface may include one or more buttons, levers, switches, display screens, keypads, touchscreens, or any other device(s) capable of providing an interface to a user of the IED. The user interface is connected with, and acts as an interface to, a processor or processors. As such, the user interface may provide display of the electrical parameters derived by the processor. In addition, commands for the processor may be entered using the user interface, which may also be used to parameterize the IED.

Although discussed in more detail below, the processor may be, for example, a microprocessor, an electronic control tool, or any other device capable of executing instructions, monitoring electrical inputs, and providing electrical outputs. The processor may perform calculations, operations, and other logic-related tasks to operate the IED. In one embodiment, the processor may operate as a function of the software configuration. The software configuration may be stored in a memory connected with the processor. The processor and the memory cooperatively operate to form the central processing unit (CPU) for the IED.

In an embodiment, the memory may be a non-volatile memory, such as for example a flash memory device or other similar memory storage device in communication with the processor. The memory may store the electrical parameters derived by the IED during operation. The memory may also store the software configuration of the IED. In addition, the memory may be used to store other information pertaining to the functionality or operation of the IED.

In another embodiment, the memory may include both non-volatile memory and volatile memory. The memory may store a first portion of the software configuration in the non-volatile memory and a second portion of the software configuration in volatile memory. In this embodiment, the volatile memory may be used to limit the amount of more costly non-volatile memory required. The first portion of the software configuration may include instructions that instruct the IED to retrieve the second portion of the software configuration from another location. As such, when power is applied to activate the IED, the instructions in the non-volatile memory are executed and the remaining software configuration is transferred from the remote location to the non-volatile memory.

As used herein, the term "IED" may be used interchangeably with the term "IEDs." For example, the term "IED" may be used to discuss aspects involving one IED 118 and "IEDs" may be used to discuss aspects involving multiple IEDs 118.

According to an embodiment in the power setting, application software or components installed on, e.g., IEDs 118, may include one or more software programs designed to derive, display, utilize and manipulate the data within the IED 118. Components may include measurement and recording applications, derivation applications, measurement and control applications, communications applications and any other applications providing functionality to the IED 118.

The components may also include standard application software components and custom application software components. Standard application software includes those components developed by the manufacturer that may be provided as standard functionality within the IED 118. Standard application components typically perform the more usual and customary functions for which the IED 118 is designed.

Custom application software components include those components specifically tailored to the needs of a user, or a group of users operating the IED 118 in the field. Any component that is not "off the shelf" software may be considered custom application software. Custom application software components may be developed by the end users, third parties, or by the manufacturer of the IED 118. In some embodiments, end users and/or third parties may be restricted from developing or installing custom application software components for, e.g., security and reliability reasons. In other embodiments, end users and/or third parties may be allowed to develop or install custom application software components, but the custom components will be forced to run in a "sandboxed" environment on a particular device, apart from the processing of mission critical functions. In an embodiment, the sandboxed environment may include spatial partitioning and temporal partitioning, including a list of functions usable by applications and other limitations, in order to control and limit the possible usage of an application or the sandboxed environment.

According to some embodiments, both standard application software components and custom application software components may be available for download from, e.g., app store 110, or any other repository of components, and may be subject to any of the commercial and non-commercial software terms discussed herein.

According to some embodiments, both standard application software components and custom application software components may be organizationally described as a plurality of frameworks. The frameworks may be an object oriented software architecture allowing the organization of the various operations performed by the IED 118. Accordingly, each of the frameworks in a software configuration may represent one or more parts of the component. For example, a framework identified as a setpoint framework may contain operating instructions for the IED 118 pertaining to setpoints for the various electrical parameters derived by the IED 118. Other exemplary frameworks may include, e.g., a historic data logging framework, a harmonic measurement framework, a display framework, a digital inputs framework, an alarm framework, a revenue framework or any other framework representing some portion of the functionality of the IED 118.

Each of the frameworks of one embodiment includes a plurality of modules. The modules may operate within an object oriented software construct, and development of a framework may be accomplished by linking several modules together. The modules may represent logic tasks performed to manipulate, derive, store, transfer or otherwise process data. The data input to the modules may be received by the framework from data inputs to the IED 118, or may be the data output from another framework. An IED 118 may have several frameworks operating independently or in combination with other frameworks to perform various management, control, derivation, storage communication and/or other functions of the IED 118. According to some embodiments, any framework or plurality of modules may be available for download from, e.g., app store 110, or any other repository of frameworks, modules, and/or components.

Maintenance tools 116 and IEDs 118 may be networked via, e.g., a customer network 114, and may be controlled or accessed by a customer device, e.g., mobile device 112, or via inventory server 108 or app store 110, or registration server 102 or power services server 104. Mobile device 112 may be a customer smartphone, laptop, netbook, tablet, or other similar mobile computing device, and may connect to maintenance tools 116 and IEDs 118 via customer network 114, via near field communication ("NFC"), or via other short or long-range communication protocols, e.g., RF, infrared, or other technology. According to various embodiments, the devices of FIG. 1 may in general communicate via any of digital or analog I/O, Ethernet, wireless, NFC, Fieldbus (Ethernet, IEC61850, Profibus), HMI, Zigbee, USB, CAN, Bluetooth, light sensor, or other communication protocols.

The servers and devices described herein may also be networked via network/cloud 106, which may comprise any public or private wired or wireless network, and which may be managed by, e.g., a cloud services provider. More specifically, the network 106 may be the Internet, a public or private intranet, an extranet, or any other network configuration to enable transfer of data and commands. An exemplary network configuration uses the Transport Control Protocol/Internet Protocol ("TCP/IP") network protocol suite, however, other Internet Protocol based networks are contemplated. Communications may also include IP tunneling protocols such as those that allow virtual private networks coupling multiple intranets or extranets together via the Internet. The network 106 may support secured or unsecured application protocols, such as, for example, telnet, POP3, Mime, HTTP, HTTPS, PPP, TCP/IP, SMTP, proprietary protocols, or any other network protocols known in the art.

Figure 2:
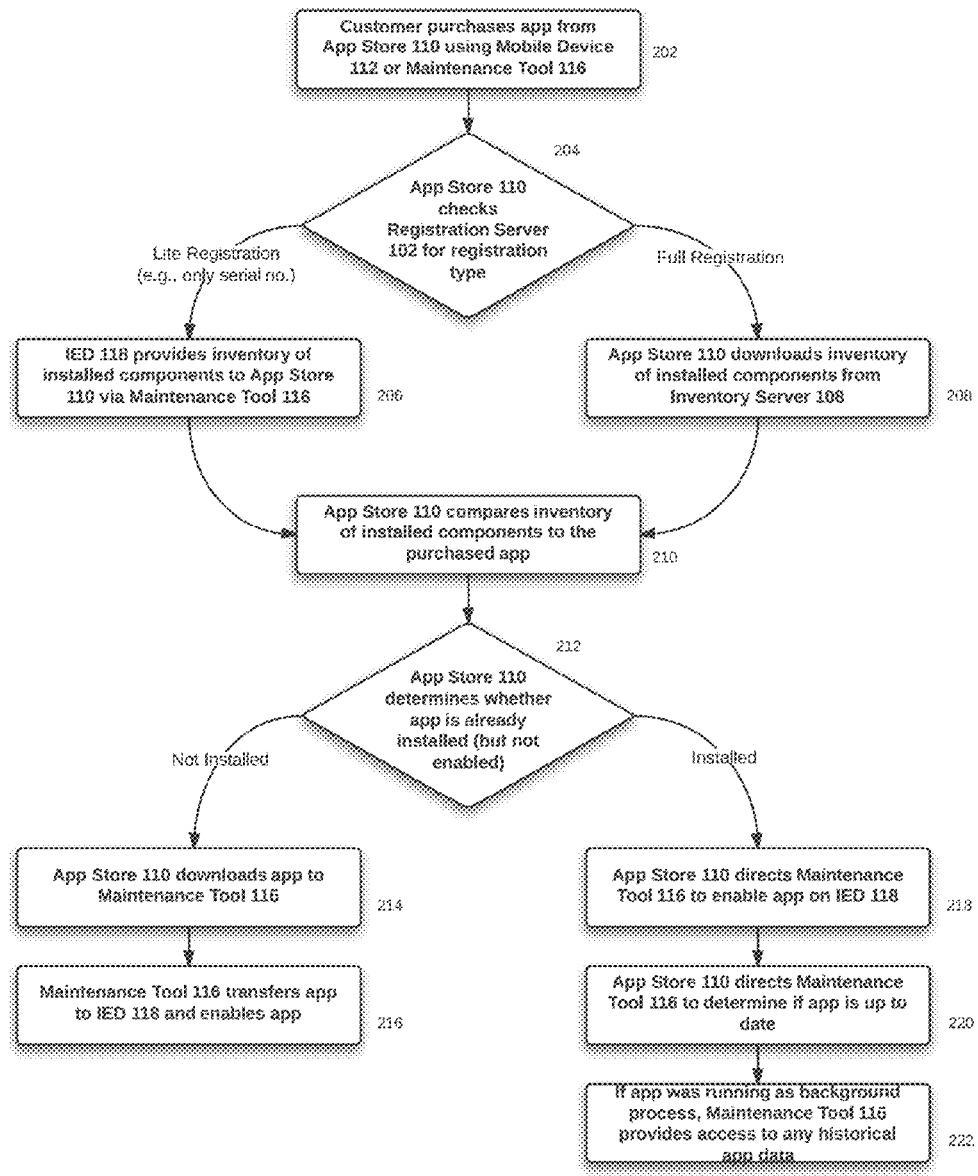
FIG. 2 illustrates a high-level flowchart of downloading and installing a component from an app store based on certain criteria, in accordance with some embodiments.

FIG. 2 illustrates a high-level flowchart of downloading and installing a component from an app store based on certain criteria.

According to an embodiment, in block 202, a customer purchases a component or "app" from app store 110 using mobile device 112 or maintenance tool 116, e.g., a smartphone, tablet, or PC, with the app intended for a particular device or devices, e.g., an IED 118. As discussed above, a customer "purchase" may entail downloading software under any commercial or non-commercial mechanism such as pay for use, a trial period, freeware, shareware, or open source offering.

A customer purchase may be motivated by the highly customizable and configurable nature of an IED, which lends itself to solutions satisfying the specific needs of a user's power management applications. However, this requires the user of the IED to configure and tailor the frameworks to their needs, as it would be impractical for the manufacturer to offer every conceivable combination of options and software. Further, the capabilities of the IED make it almost impossible to predict the functionality desired by each user. Accordingly, the purchase mechanism described herein and depicted in block 202 provides for the desired customization.

In block 204, app store 110 checks registration server 102 for a registration type, e.g., whether a user or device has completed a "lite" registration or a full registration stored with the registration server 102. In alternative embodiments, the app store 110 may check inventory server 108 for such information, or app store 110 may itself have a flag or other indicator of registration type.

In an embodiment, a lite registration may include basic information about the device that had been transmitted to registration server 102 or inventory server 108, such as the serial number of a device, or that a particular device is authorized to connect to, e.g., power services server 104 or app store 110, or information about the customer, such as a customer profile. In an embodiment, a full registration may comprise the same information included in a lite registration, as well as an inventory of components installed on the particular device and a deeper level of, e.g., customer or device information.

If registration server 102 or inventory server 108 returns only a lite registration without an inventory of components installed on the requesting device or devices, in block 206 the app store 110 may trigger a maintenance tool 116 or IED 118 to provide a list or inventory of installed components on the requesting or target install device, e.g., an IED 118. Such an inventory may be collected using local software on the IED 118 configured to provide an inventory of installed software, or software executed on a maintenance tool 116 in communication with an IED 118. Such an inventory may then optionally be stored at, e.g., inventory server 108 or another database for future access.

If registration server 102 or inventory server 108 returns a full registration or at least an inventory of components installed on the requesting device, e.g., an IED 118, the app store proceeds in block 208 without triggering maintenance tool 116 or IED 118 to provide a local inventory of installed components on the requesting device, e.g., an IED 118. In some embodiments, block 208 may further comprise a check to determine if the cloud-based inventory is up to date by, e.g., checking a "last update" date, or by comparing the cloud inventory to the local inventory at preset intervals.

In block 210, app store 110 compares the inventory, e.g., the inventory returned from registration server 102 or inventory server 108 (a cloud inventory), or directly from IED 118 (a local inventory), to the purchased app to determine, in block 212, whether the app is already installed, but not yet enabled. App store 110 may make such a determination based on comparing information related to the component, e.g., a component ID or other unique identifier, to respective information in the cloud inventory or local inventory.

If the component is already installed on the requesting device, e.g., IED 118, the app store enables the app on the requesting device without first downloading the app, in block 218. For example, app store 110 may direct or trigger a maintenance tool 116 to enable the purchased app on an IED 118. Alternatively, app store 110 may direct or trigger an IED 118 directly to enable the purchased app. The app store may enable the component on the device using, e.g., a signal or other authorization, e.g., a key, sent to the device to enable the component on the device. It can be appreciated that the enabling mechanism may be in the form of a code that is displayed for the user to enter through a user interface to enable the feature, i.e., on a maintenance tool 116, or that the enabling mechanism may operate "behind the scenes" and automatically enable the feature once the billing data has been authorized.

In an embodiment, the app may also check that the app is up to date, and if not, may download a delta or difference file representing the updated portions of the component.

If the component is not already installed on the requesting device, e.g., IED 118, the app store triggers a download, in block 214, of the app to, e.g., maintenance tool 116 for transfer to IED 118, in block 216, and enables the app on the requesting device, e.g., IED 118. Alternatively, app store 110 may directly trigger a download and enablement to IED 118 without an intermediary device, e.g., without maintenance tool 116.

As can be understood from FIG. 2, the flow may be repeated as necessary should the user purchase two or more components.

According to some embodiments, users completing a full registration may also receive suggestions for purchasing new components based on the user's past purchase history or perceived needs. Alternatively, the app store may offer bundle discounts, or the ability to activate native features at a lower cost, etc. based on information in a full registration user profile. Such offers to customers may be made during, e.g., the execution of the flow of FIG. 2, or via other promotional mechanism, e.g., via e-mail. Custom software dedicated to a particular customer or groups of customers may be provided via the app store and based or configured on, e.g., the full registration.

Figure 3:
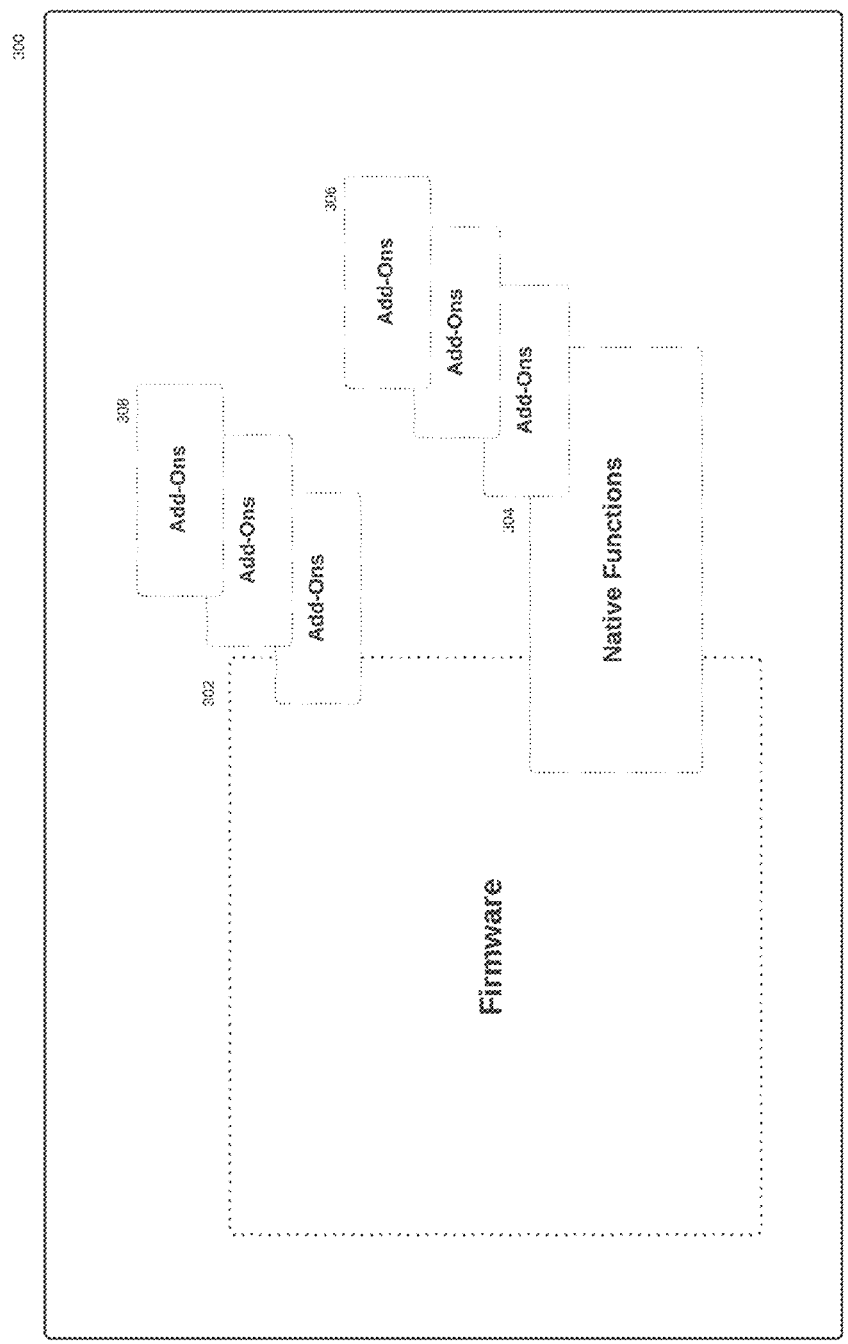
FIG. 3 illustrates device software installed on a device including exemplary firmware, native functions, and components (or "add-ons"), in accordance with some embodiments.

FIG. 3 illustrates device software installed on a device including exemplary firmware, native functions, and components or "add-ons", in accordance with some embodiments.

Device software 300 may include any of the various power management and monitoring functions used in the power sector from basic voltage monitoring to detailed monitoring of, e.g., overall ambient and environmental conditions such as climate (temperature, humidity, etc.) and process (vibration, shocks, bumps, dust, etc.), or other functions.

The user of device software 300, or of various functions within device software 300 or resulting data, may be one or more of management, engineering, front offices, back offices, maintenance operators, facility managers, process operators, contractors, consultants, distributors, retailers, panel-builders (that purchase individual products from a device manufacturer and deliver integrated switchboards to users), power service providers, utility companies, or any other personnel involved in power delivery or power management.

Device software 300 includes firmware 302 which may be a combination of persistent memory and program code and data stored on a device, e.g., an IED, used to control the device, and which may be stored in non-volatile memory devices such as ROM, EPROM, or flash memory. In an embodiment, firmware 302 is developed and installed by a device manufacturer.

Device software 300 may also include native functions 304, e.g., functions that are developed by the device manufacturer and made part of the firmware 302 or device software installed at the factory. However, a device manufacturer may choose to enable none, some, or all of the native functions based on a particular customer use or business model. In contrast, firmware 302 may be fully enabled to allow basic use of the device.

Device software 300 may also include components or add-ons 306 and 308 that add functionality to firmware 302 or native functions 304. Add-ons may be, for example, the components or apps available for download and install, as described herein. The combination of firmware 302, native functions 304, add-ons 306 and 308, and the ability to selectively enable, disable, download, and install each may support various technical and business models relating to the devices, software, and business models. For example, enabling native functions 304, or purchasing add-ons 306 or 308, may allow a user to add functionality to a device for a cost, without having to fully replace or upgrade firmware 302, which may be a time consuming process, particularly on devices considered mission critical.

According to some embodiments, native functions 304 may be enabled, and add-ons 306 may be installed not only by the end user after purchase, but also by the power device manufacturer after production but before shipment, or by an intermediary, e.g., a reseller or distributor.

Figure 4:
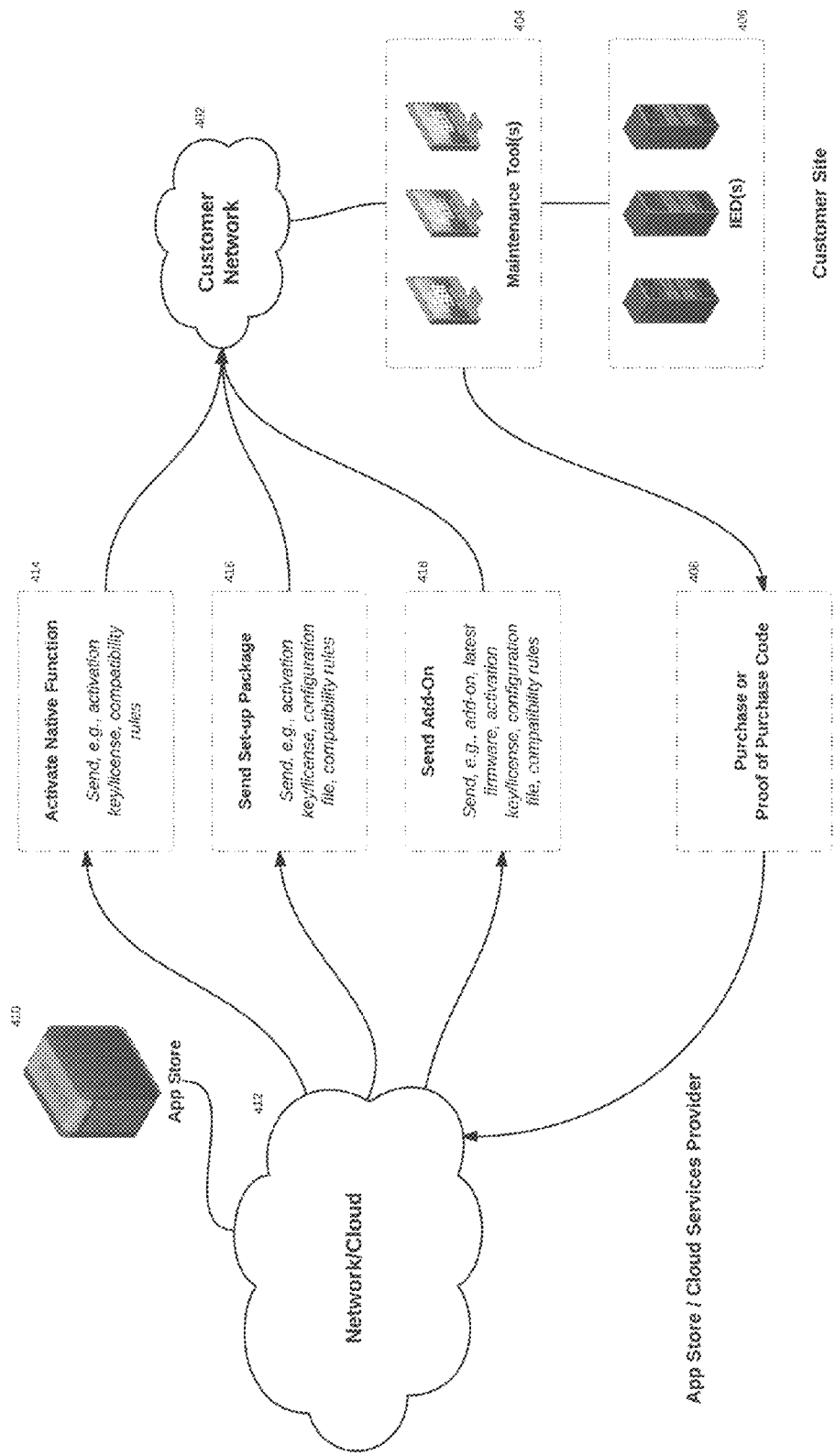
FIG. 4 illustrates a flowchart of download options for downloading a component from an app store based on certain criteria, in accordance with some embodiments.

FIG. 4 illustrates a flowchart of download options for downloading a component from an app store based on certain criteria, in accordance with some embodiments. In an embodiment, in block 408, a user operating maintenance tools 404 or IEDs 406 purchases a component from app store 410 or enters a proof of purchase code that is transmitted to app store 410 through customer network 402 or network/cloud 412.

App store 410 may maintain financial accounting mechanisms associated with modifications and upgrades to IEDs 406 previously installed in the field. Financial accounting may include, for example, providing pricing for various available components or activations of native features, maintaining charge accounts for different users, and providing methods of online payment. For example, where a user wishes to upgrade the software configuration of a group of IEDs 406 to include historical data logging, app store 410 may determine the cost for the upgrade to each IED 406 and present a total price to the user. Following selection of a payment method and entry of billing information, the user may be allowed to proceed with the transfer of the component or enablement of a previously installed component, described in more detail below, to the corresponding IEDs 406.

Methods of online payment may include, for example, pre-authorized payment structures that may further include user credit systems or authorized billing codes. Direct or pre-authorized payment plans may occur through an interface on the app store 410. Further, communication with other payment authorization services such as, for example, online credit-card networked servers may also be utilized to provide and authorize online payments. Exemplary well-known payment authorization services include, for example, Visa™, MasterCard™, debit cards, electronic payment cards, or any other authentication systems for financial information. It may be appreciated that the actual billing authentication may take place independent of the app store 410.

In response to the purchase, or proof of purchase, in block 408, app store 410, in coordination with the flow of FIG. 2, either activates a native function, sends a set-up package, or sends an "add-on" or component to IED 406.

In block 414, if a native function purchased by the user is installed on a given IED 406 but not enabled, block 414 activates the native function by sending, e.g., an activation key or license, and minimum compatibility rules to maintenance tools 404 or IEDs 406. The minimum compatibility rules may be utilized to ensure that the firmware or other software on IEDs 406 is sufficient to enable and run the native function. The minimum compatibility rules may also be combined with an update, or delta file, to the native function that is being activated.

In block 416, if a function is installed but not enabled on a given IED 406 and a configuration file or files are missing for enabling the function on IED 406, block 416 sends a set-up package to maintenance tools 404 or IEDs 406, which may be similar to activating a native function, but with added configuration information as part of the set-up package. A set-up package may be bound to a particular IED 406, or a particular model of IEDs 406. In an alternative embodiment, the component may be enabled using a default configuration created by, e.g., app store 410.

In block 418, if an "add-on" or component purchased by the user is not installed on a given IED 406, block 418 sends the component to maintenance tools 404 or IEDs 406. The component may include the component or app software itself, an activation key or license, a configuration file, and minimum compatibility rules.

Blocks 414, 416, and 418 may additionally check CPU, memory, and storage constraints on a given IED 406 prior to commencement. For example, the remaining execution capability of the IED may be determined, taking into account the CPU processing capacity, available memory, or other resources constraints. If CPU, memory, or storage constraints prevent installation of a component, a user may be presented with the option to disable or delete other components presently running or installed, provided that disabling or deleting the component will not affect other component dependencies. A maximum number of components installed, i.e., an install limitation, may also be set, or a maximum number of components or native functions running concurrently or resident in memory concurrently may be set.

During installation, basic protection functions and cost measurements may be required to remain running on an IED while other less critical functions are halted to provide resources for the installation process. A backup routine of various components or component data, or a ghost image used for rollback purposes, may be made prior to installation of a new component or even enablement of a native function.

Upon completion of blocks 414, 416, or 418, a status report may be sent via any electronic transmission means, e.g., a reporting system, e-mail, or SMS, indicating the status of the installation as, e.g., installed, failed, failed due to insufficient resources, etc. An inventory server, e.g., inventory server 108, may also be updated. The logging may allow the user to access a stored log of information regarding the status of update transfers and upgrades. For example, a user may specify a batch upgrade of several IEDs 406. The upgrade status and error logging may be utilized to aid the user in confirming successful completion of, or errors within, the upgrade process in each of the IEDs 406.

In addition, app store 410 and IEDs 406 may allow for revision control. Revision control may include the capability to revert to the previously operating software configuration option. In addition, revision control may allow the user to manage, view and evaluate changes and discrepancies between new components, existing configurations, and previous configurations. The ability to revert to the previous software configuration may allow a user to view the previous configuration and switch the IEDs 406 to operation with the previous configuration if deemed necessary. Management of the changes and discrepancies may include identification of discrepancies, suggested fixes for the discrepancy, as well as error identification within the software configuration.

In another embodiment, IEDs 406 may include security measures as part of the update process. In this embodiment, when IEDs 406 receive, e.g., a transmission from block 414, 416, or 418, the IEDs 406 may notify a system administrator of the pending update. The system administrator may be the owner of the IEDs 406 or some other individual overseeing operation, such as the power services provider. The IEDs 406 may notify the system administrator by an email message, an alarm message, a pulse output, a pager message, or any other form of notification and may require some form of approval by the system administrator prior to accepting the update. The update may be received by the IEDs 406 and held without implementation until approval by the system administrator. In another embodiment, the IEDs 406 may be completely prevented by the system administrator or other entity from accepting updates.

Figure 5:
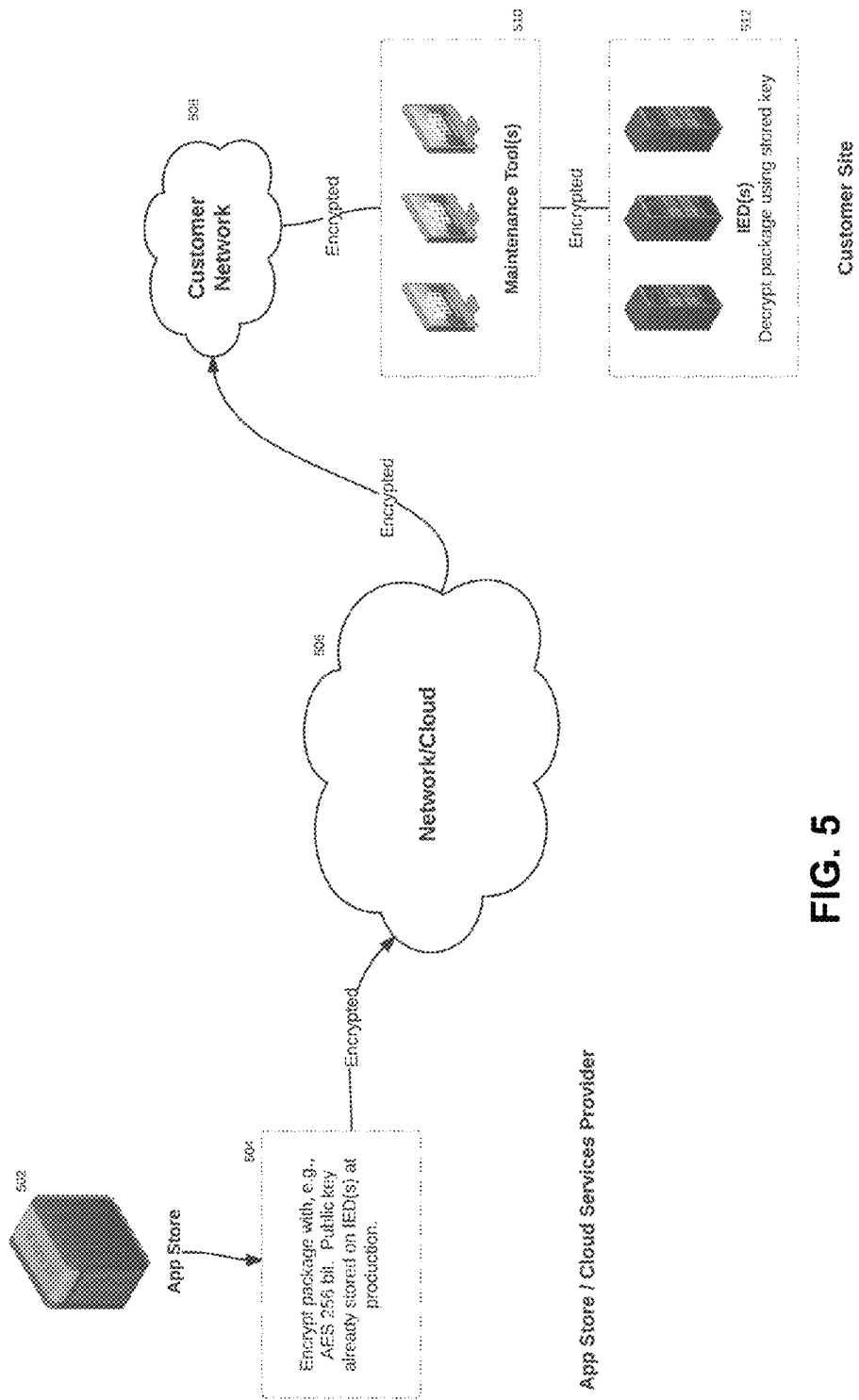
FIG. 5 illustrates a flowchart of a secure download for downloading a component from an app store based on certain criteria, in accordance with some embodiments.

FIG. 5 illustrates a flowchart of a secure download for downloading a component from an app store based on certain criteria, in accordance with some embodiments.

In an embodiment, app store 502 encrypts a data package, e.g., the data transmitted in FIG. 4, with an asymmetric or symmetric encryption standard with a particular key length, such as 256 bits. For example, in some embodiments, Advanced Encryption Standard (AES) may be used, while in some embodiments, RSA encryption may be used. The encrypted data is then transmitted to network/cloud 506, which may be any public or private network as discussed above, to customer network 508. While still encrypted, the data is transmitted to maintenance tools 510 and then to IEDs 512. Alternatively, the data may be transmitted directly from customer network 508 to IED 512.

IEDs 512 may decrypt the data using a key stored on the IEDs during manufacturing, e.g., by a power device manufacturer. However, those skilled in the art will appreciate that any suitable means of encryption and decryption may be employed.

According to some embodiments, the encrypted data may be linked to a unique identifier of a particular maintenance tool 510 or IED 512. In embodiments allowing for multiple downloads of a particular component, at each download the counter of available licenses is decreased. In the event that a user uninstalls a component from an IED, the counter may be increased as appropriate.

According to some embodiments, a third-party licensing tool may be utilized to manage licensing. A third-party licensing tool may, e.g., create an unsigned license file with a component name, version, expiration date, serial number, and other information at app store 502 or a separate licensing server, and generate a signed license file encrypted as disclosed herein. The license file may comprise, e.g., a binary file, XML file, or file in another format.

In the embodiment with a third-party licensing tool, at the IED 512, a license source collection may be created and populated with the licensing information read from the binary file after decryption, thereby adding the license source to a license collection and setting license rights and rights flags. In various embodiments, to manage CPU workload, license rights checks may be set at pre-defined intervals such as once every 24 hours, using rights flags to determine whether a component may be run. Components with no rights, or expired rights, will not be permitted to run, or completely uninstalled at runtime.

According to some embodiments, a trial period or limited usage period for a particular component may begin upon decryption, and a counter may be set accordingly to allow for deactivation of a component, or to prompt a user to purchase a full license at preset intervals. License reminders may also be sent at preset intervals via, e.g., e-mail.

According to other embodiments, FIG. 5 may include authentication, e.g., signature processing, applications on, e.g., a firewall/gateway server. Authentication may be performed for commands or data sent or received over the network 506. More specifically, authentication is the process of determining and verifying whether the device transmitting data or commands is the device it declares itself to be. In addition, authentication prevents fraudulent substitution of devices or spoofing of device data generation in an attempt to defraud. Parameters such as time/date stamps, digital certificates, physical locating algorithms such as cellular triangulation, serial or tracking IDs, which could include geographic location such as longitude and latitude, may be parameters included in authentication. Authentication may also minimize data collection and control errors within the network 506 verifying that data is being generated and that the appropriate devices are receiving commands.

The firewall function may perform network security by isolating internal systems from unwanted intruders. In an exemplary embodiment, a firewall/gateway server for maintenance tools 510 and IEDs 512 may isolate all internet traffic that is not relevant to the operation of those components. In this example, the only requests allowed through a firewall in front of maintenance tools 510 and IEDs 512 may be for services pertaining to an IED. All requests not validated and pertaining to the IED may be blocked by the firewall/gateway server.

Figure 6:
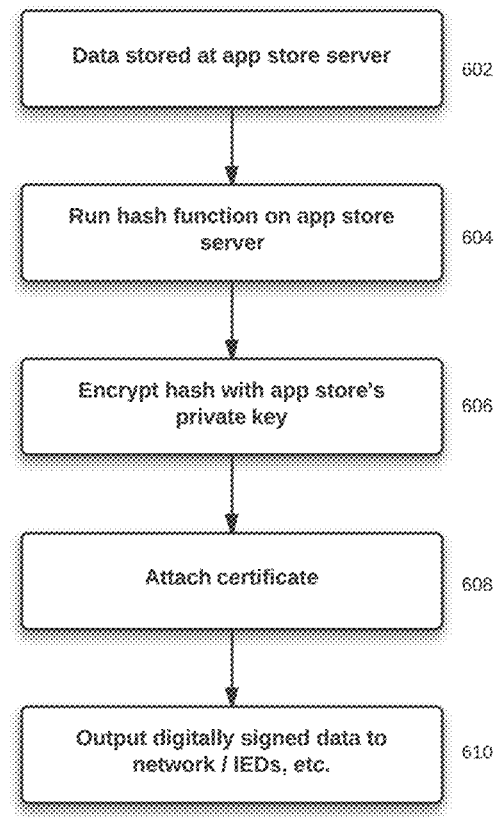
FIG. 6 illustrates a flowchart for encrypting and signing a component on an app store, in accordance with some embodiments.

FIG. 6 illustrates a flowchart for encrypting and signing a component on an app store, in accordance with some embodiments. In an embodiment, in block 602, data is stored at the app store server, e.g., app store 502. In block 604, app store 502 runs a hash function on the data. Since there is no guarantee of source at this point, in blocks 606 and 608, app store 502 encrypts the hash with the app store's private key and attaches a certificate. In block 610, the digitally signed data is output to be used, e.g., as shown in FIG. 7.

Figure 7:
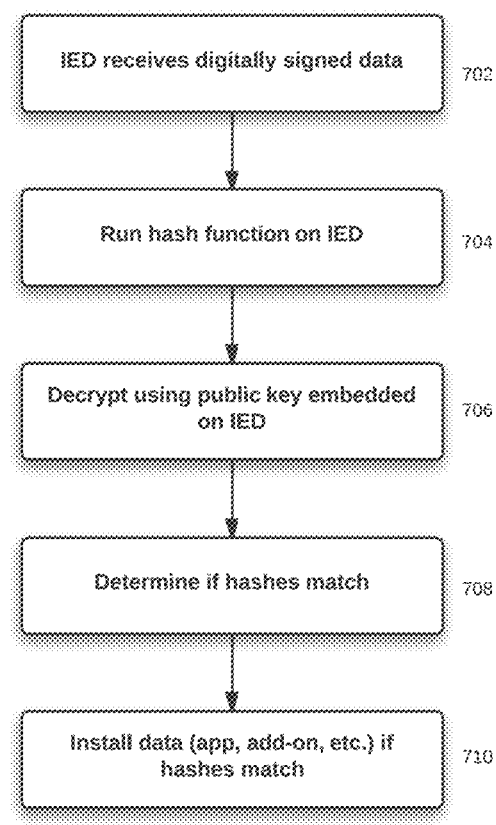
FIG. 7 illustrates a flowchart for decrypting and verifying a component on an app store, in accordance with some embodiments.

FIG. 7 illustrates a flowchart for decrypting and verifying a component on an app store, in accordance with some embodiments. In an embodiment, in block 702, IEDs 512 receive the digitally signed data, as described in reference to FIG. 6

In block 704, a hash function is run on IED 512, using the same hash function run on app store 502. In block 706, the data is decrypted using the app store's public key embedded on IED 512, producing a new hash. In block 708, IED 512 determines whether the hashes match. If the hashes match, the app or add-on, etc., may be verified as authentic and installed or enabled on IED 512, thereby preventing the installation of add-ons developed or modified by non-authorized sources such as a pirate, hacker, or a "man in the middle attack" to, e.g., collect private data, conduct espionage, or generate a fault on an electrical device.

Although blocks 702 through 708 above are carried out on an IED 512 to provide for a maximum level of security, in alternative embodiments, maintenance tool 510 may carry out blocks 702 through 708 and transmit unencrypted data, e.g., on a local network, to IED 512.

According to various embodiments, a certificate pre-installed on an IED 512 may comprise the public key and information about the sender or app store 502, negating the need to exchange certificates after sale of a given IED 512.

Figure 8:
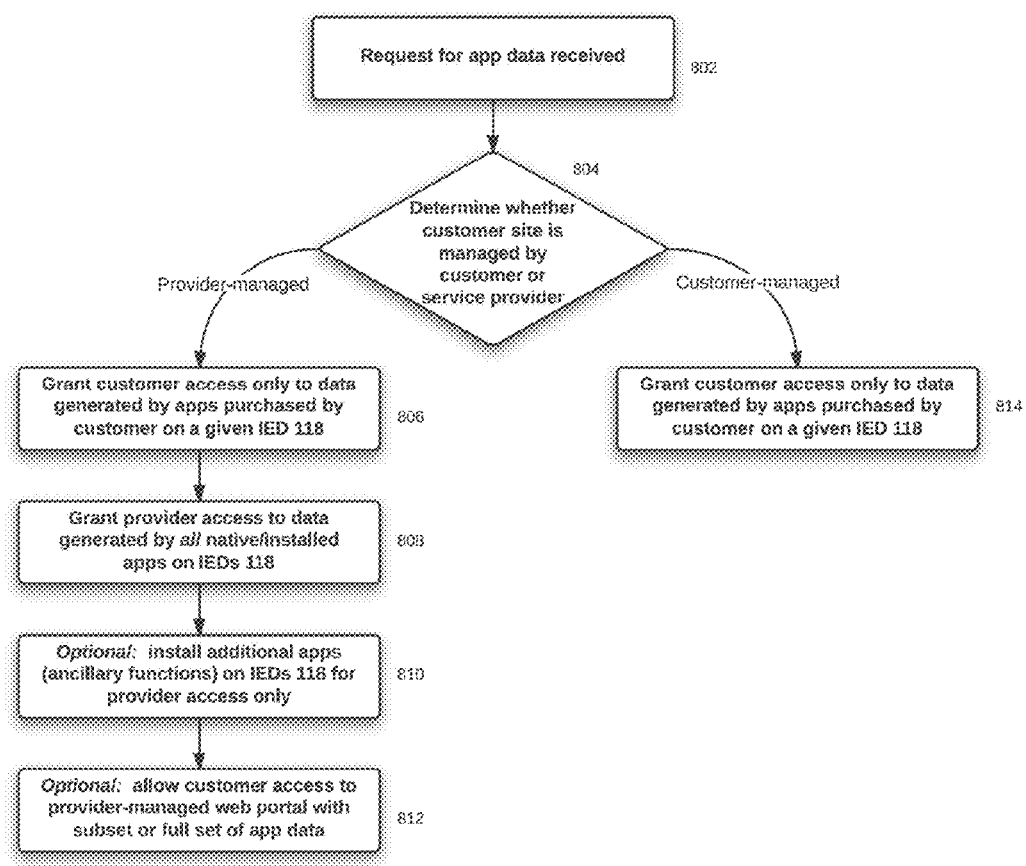
FIG. 8 illustrates a high-level flowchart of providing selective access to components based on certain criteria, in accordance with some embodiments.

FIG. 8 illustrates a high-level flowchart of providing selective access to components based on certain criteria.

In block 802, a request for access to a component, or request for access to component or app data, is received by, e.g., a computer, server, or other device maintained by a customer, service provider, or third party. In block 804, a determination is made as to whether the customer site is managed by the customer or the service provider.

If the customer site is managed by the customer, in block 814, the requesting device is granted access only to the components, or data generated by components, that were purchased by the customer on any given requesting device, e.g., on a maintenance tool 116 or IED 118.

If the customer site is managed by a service provider, in block 806, a requesting customer device is granted access only to the components, or data generated by components, that were purchased by the customer on any given device, while in block 808, the service provider may be granted access to all components pre-installed, and all data generated by components pre-installed, on any given requesting device, e.g., on a maintenance tool 116 or IED 118.

In an embodiment, in block 810, additional components or ancillary functions may be installed on IEDs 118 at the direction of the service provider, for access by the service provider only. More specifically, according to some embodiments, the service provider may only access components that are pre-installed, or "natively" installed, on the customer device, e.g., IED 118. In contrast, according to other embodiments, the service provider may install additional components onto the customer device to provide, e.g., additional data collection. Such an installation may be prompted by a customer request, or background installation with, e.g., customer permission.

The additional components may have been inaccessible if (1) a user has not purchased the component (i.e., it is selectively accessible to the user, conditioned on payment by the user), or (2) it cannot be purchased or invoked by user. In other words, it is either inaccessible but selectively accessible (e.g., through purchase) or inaccessible and incapable of being accessed by the user (e.g., through payment).

In block 812, the service provider may allow the customer access to some of these additional components or ancillary functions, or data from these additional components or ancillary functions, through a provider-managed service such as a web portal, in either a full or preview mode.

More specifically, the exemplary embodiment of FIG. 8, and in particular block 808, may enable a service provider to collect data that is monitored, generated, or aggregated by various components installed on, e.g., an IED 118, without providing access to the components or data to a user so that the service provider may, e.g., provide power management services to customers; report, analyze, or otherwise use said data; add or enable functionality on, e.g., maintenance tools 116 or IEDs 118; preview or upsell components to customers; or otherwise add value to the customer devices or customer site in general. In some embodiments, a service provider may use access to these additional components or data for purposes not directly tied to the user, e.g., for designing hardware or software improvements, for monitoring warranty claims, etc.

According to an embodiment, access to the components or data generated by components, including any additional or ancillary features enabled by the service provider, may be granted to a subset of users. For example, facility and corporate managers may be granted access to components or data relating to analyzing energy efficiency and costs, while maintenance personnel may be granted access to components or data relating to analyzing electrical system reliability and to perform remote maintenance and troubleshooting. Selective access in this regard may also be tied to various pricing models, such as a per seat license arrangement.

According to various embodiments, authentication protocols may be employed to determine, e.g., in block 804, whether a request for access to a component or app data was received by a customer or service provider to prevent, e.g., unauthorized access, attempts at hacking, or other misuse of the system. Such protocols may include or be supplemented by, e.g., username and password authentication, encryption, public and private keys, biometric security, and/or other known security and authentication protocols, including the protocols described herein.

Figure 9:
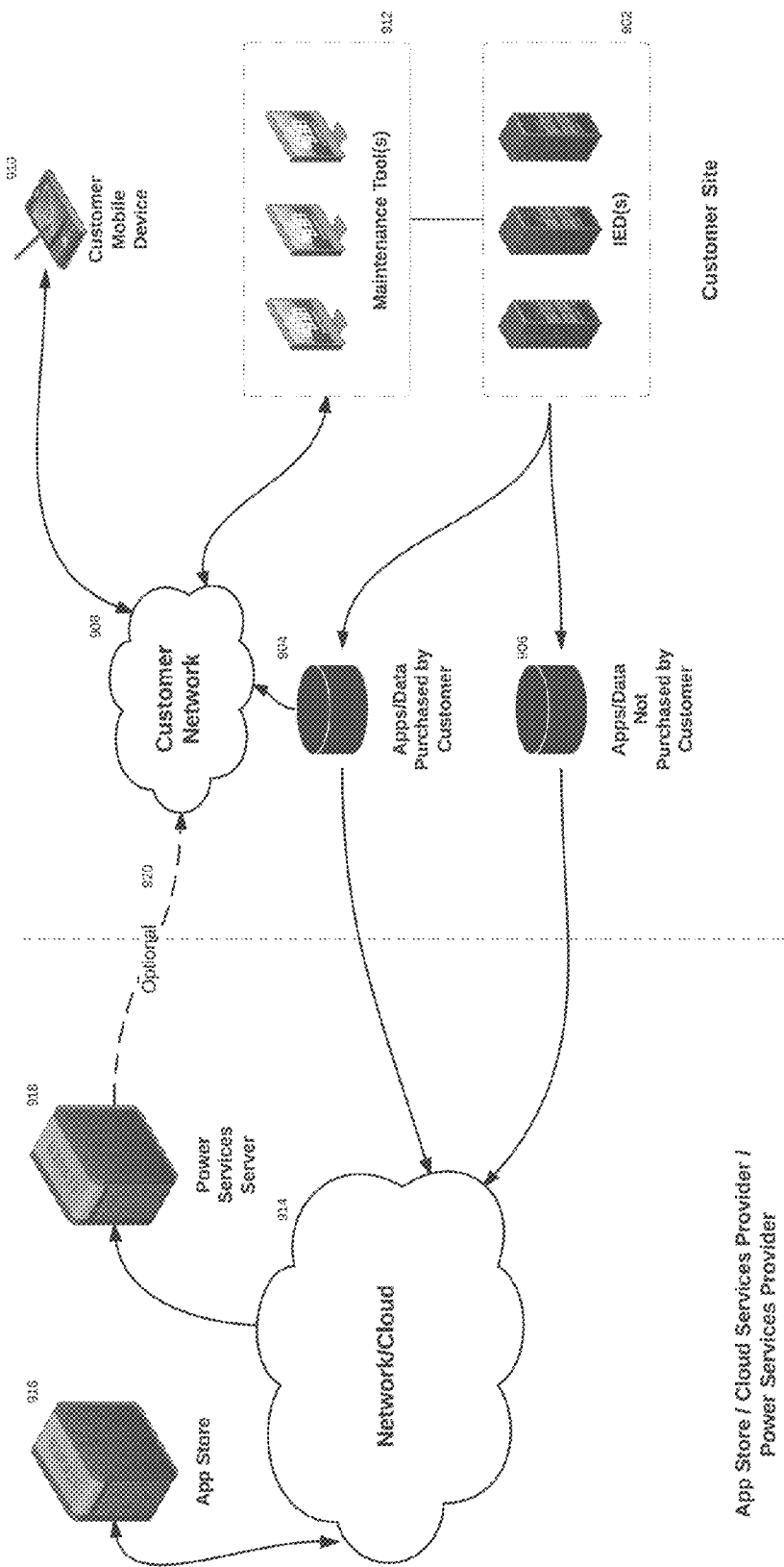
FIG. 9 illustrates a flowchart of selectively accessing components based on certain criteria, in accordance with some embodiments.

FIG. 9 illustrates a flowchart of selectively accessing components based on certain criteria, in accordance with some embodiments. According to an embodiment, app access or data access to all components (i.e., components/data 904 and 906) on IEDs 902 is open to, or transmitted to, power services provider server 918 through network/cloud 914. In contrast, app access or data access to components on IEDs 902 is open to, or transmitted to, customer maintenance tools 912 only for components or data purchased by customer (i.e., only components/data 904).

As discussed above with respect to block 812 of FIG. 8, the service provider may allow the customer access to some of these additional components or ancillary functions, or data from these additional components or ancillary functions, through a provider-managed service such as a web portal, in either a full or preview mode, as represented in FIG. 9 by transmission 920.

Figure 10:
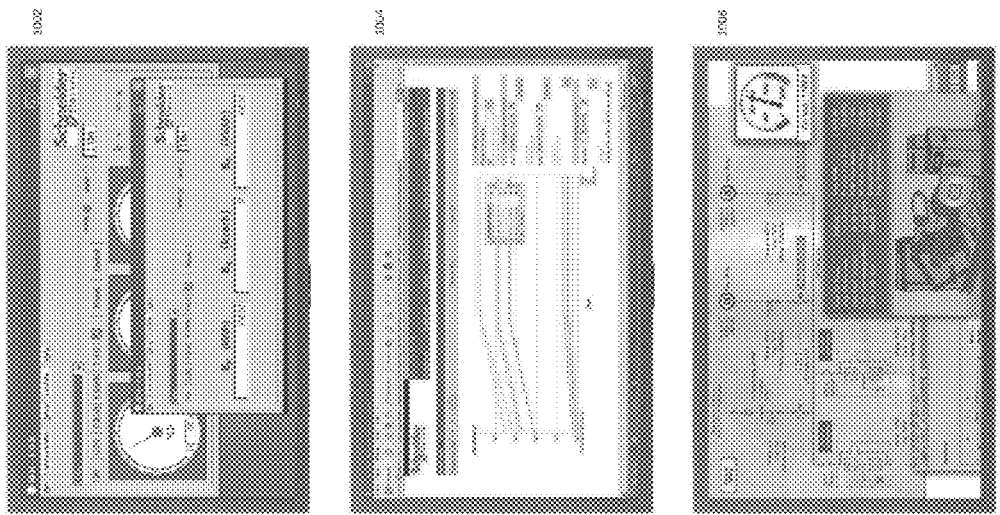
FIG. 10 illustrates exemplary screenshots of component or app data displayed to a user, in accordance with some embodiments.

FIG. 10 illustrates exemplary screenshots of component or app data displayed to a user, in accordance with some embodiments. Screenshots 1002, 1004, and 1008 may represent, e.g., displays from components installed on IEDs 118, as displayed on maintenance tools 116 by way of a direct connection to IEDs 118, or may represent displays from components installed on IEDs 118 transmitted to a power services provider, and then to customer maintenance tools 116.

Exemplary screenshot 1002 represents a utility for circuit breaker control, monitoring, and data access.

Exemplary screenshot 1004 represents a utility for delivering real-time and historical data, including charting and graphing functionality.

Exemplary screenshot 1006 represents a utility for delivering advanced energy and power quality analysis.

It will be appreciated that the components and screenshots discussed herein may be adapted for display on any of a desktop computer, laptop, netbook, tablet, smartphone, or other fixed or portable computing device, on a myriad of operating system platforms.

Figure 11:
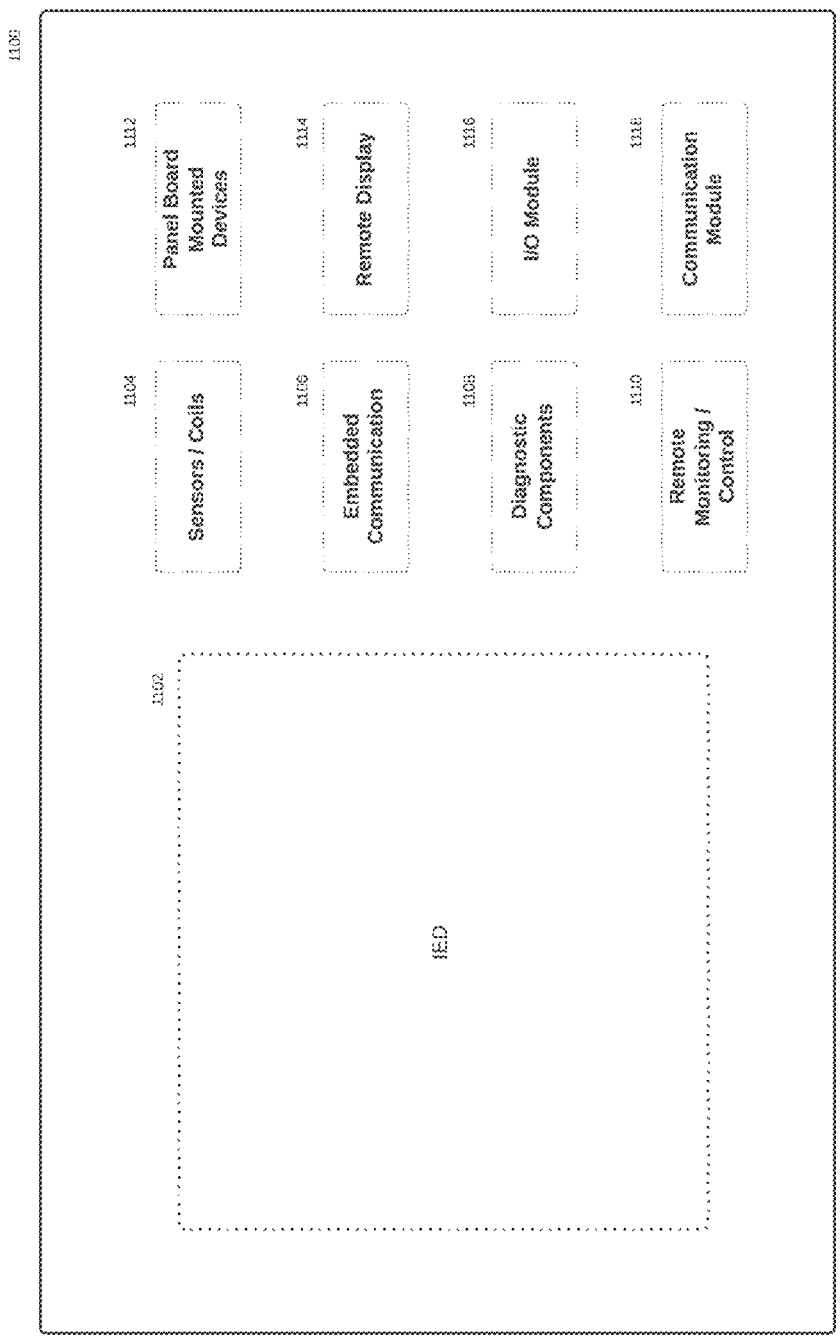
FIG. 11 illustrates the internal components, at a high level, of an exemplary intelligent electronic device for use with the embodiments disclosed herein.

FIG. 11 illustrates the internal components, at a high level, of an exemplary intelligent electronic device for use with the embodiments disclosed herein. According to various embodiments, the IED may comprise one or more of sensors/coils 1104, embedded communication 1106, diagnostic components 1108, remote monitoring/control 1110, panel board mounted devices 1112, remote display 1114, I/O module 1116, and/or communication module 1118. According to some embodiments, some or all of these modules may be added or removed in a hot-plug mode.

Figure 12:
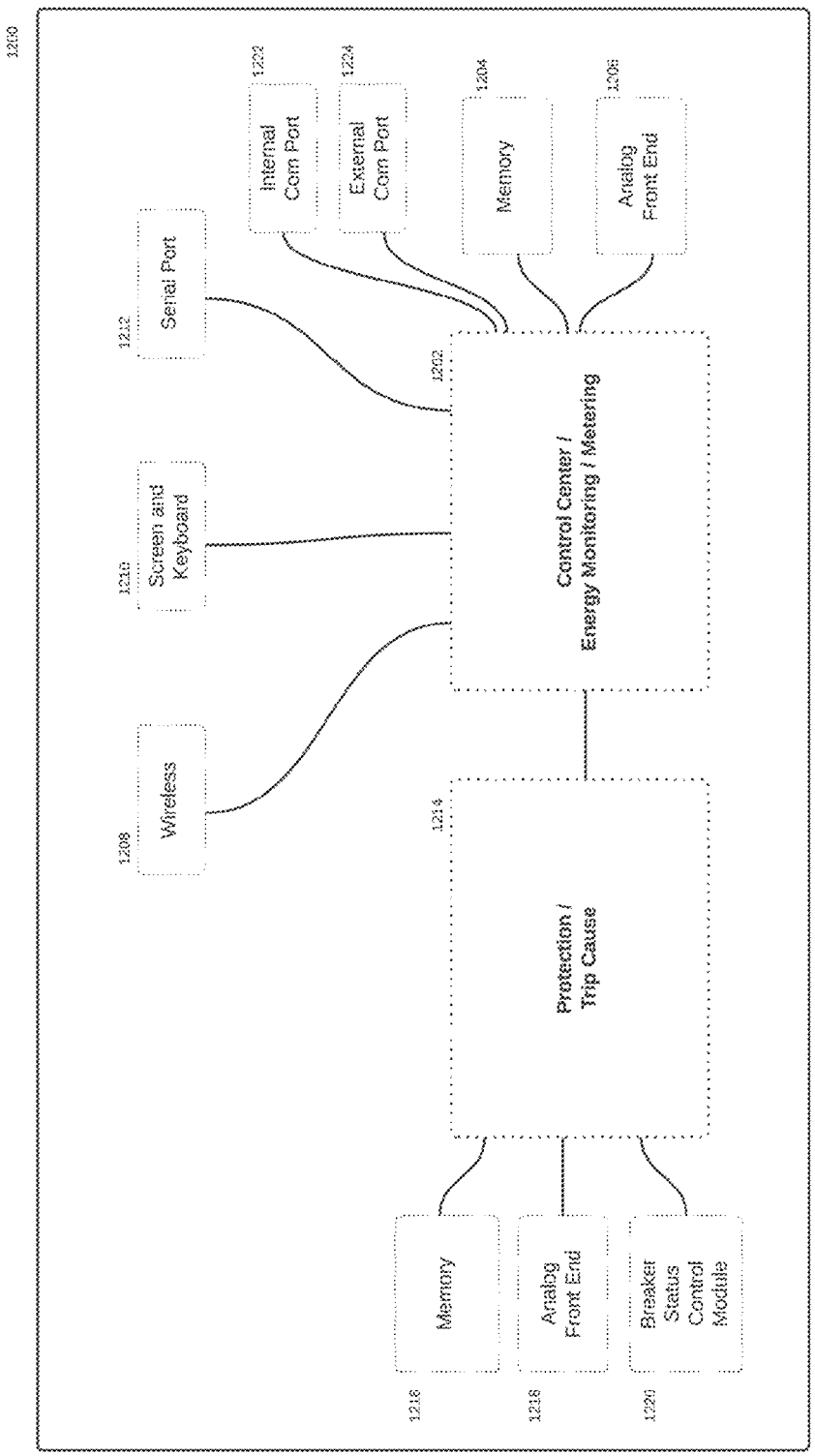
FIG. 12 illustrates the internal components of an exemplary intelligent electronic device with two microprocessors for use with the embodiments disclosed herein.

FIG. 12 illustrates the internal components of an exemplary intelligent electronic device with two microprocessors for use with the embodiments disclosed herein. In this embodiment, IED 1200 comprises a microprocessor 1214 controlling and monitoring protection and trip cause. Microprocessor 1214 may be coupled to memory 1216, analog front end 1218, and breaker status control module 1220.

IED 1200 may also comprise a microprocessor 1202 to control a control center, energy monitoring, and metering. Microprocessor 1202 may be coupled to memory 1204, analog front end 1206, wireless module 1208, screen and keyboard or other input and output device(s) 1210, and USB or other internal and/or external communication interfaces, e.g., serial, CAN, Ethernet, etc. ports 1212, 1222, and/or 1224.

Figure 13:
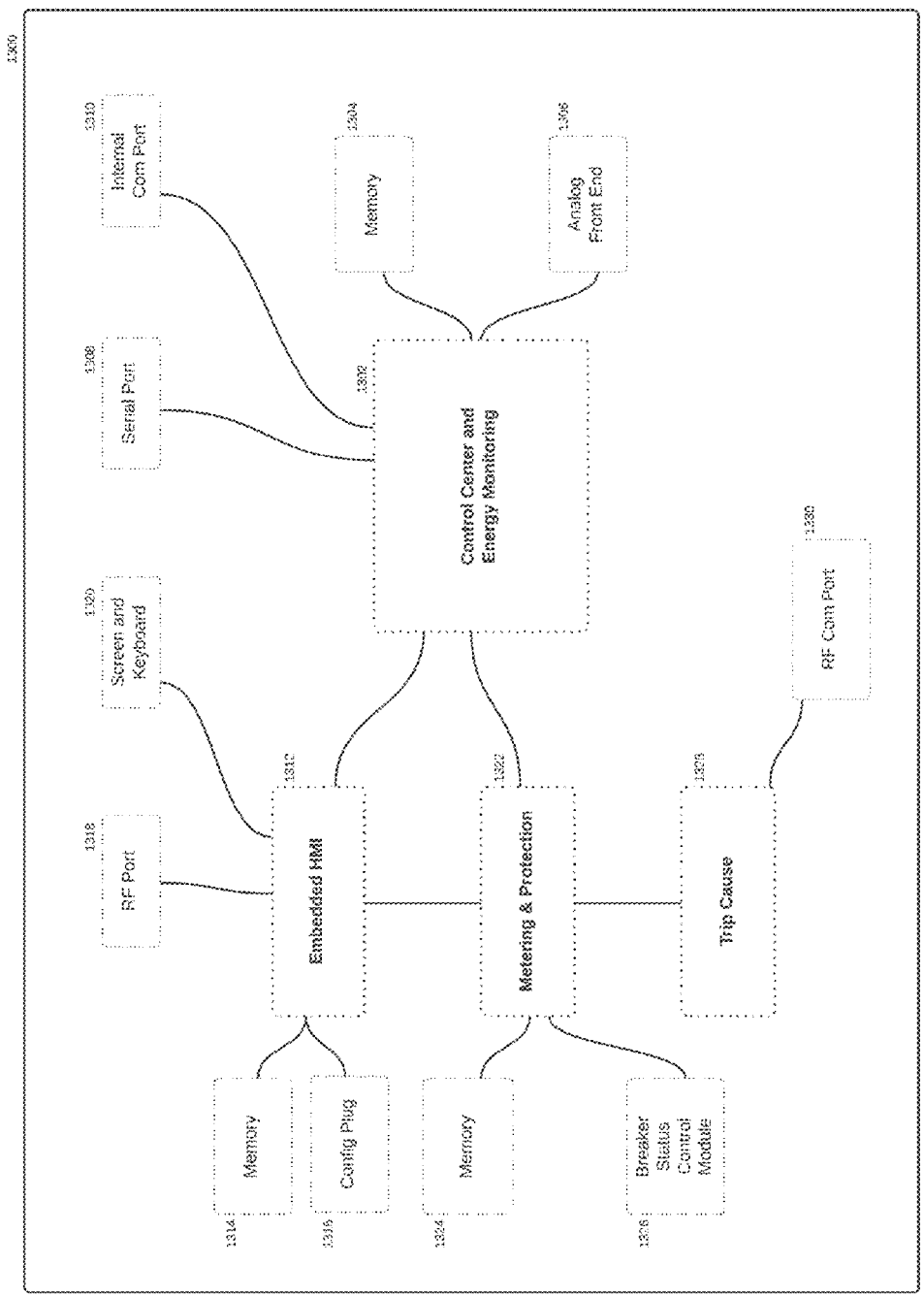
FIG. 13 illustrates the internal components of an exemplary intelligent electronic device with four microprocessors for use with the embodiments disclosed herein.

FIG. 13 illustrates the internal components of an exemplary intelligent electronic device with four microprocessors for use with the embodiments disclosed herein. In this embodiment, IED 1300 comprises a first microprocessor 1302 as a control center and for energy monitoring. Microprocessor 1302 may be coupled to a memory 1304, which may be, e.g., NOR Flash memory, non-volatile RAM, or other memory; analog front end 1306; and serial or internal communication ports 1308 and 1310, e.g., internal communication interfaces which may be CAN, Ethernet, or any other communication port.

In an embodiment, IED 1300 may also comprise a second microprocessor for controlling an embedded HMI 1312. Microprocessor 1312 may be coupled to a memory 1314, e.g., NOR Flash; a configuration plug or physical media module 1316, e.g., an SD Card or other physical media; a wireless communication module 1318, e.g., RF, Bluetooth, Zigbee or similar low-power communication protocol; and screen and keyboard or other input and output device(s) 1320. According to some embodiments, any of the ports, physical media modules, or wired or wireless communication modules may be used to upgrade the firmware of the IED 1300.

In an embodiment, IED 1300 may also comprise a third microprocessor 1322 for controlling metering and protection. Microprocessor 1326 may be coupled to memory 1324, e.g., non-volatile RAM, and to breaker status control module 1326.

In an embodiment, IED 1300 may also comprise a fourth microprocessor 1328 for trip monitoring, coupled with a communications port 1330, e.g., RF, near field communication ("NFC"), or other short or long range communication protocol. Port 1330 may be used, for example, to provide short-range communications between IED 1300 and, e.g., maintenance tools 116 or customer mobile device 112, as shown in FIG. 1 and described above.

In an embodiment, IED 1300 may also comprise a fifth microprocessor to provide other functionality (not shown).

Microprocessors 1302, 1312, 1322, and 1328 may be interconnected as shown in FIG. 13, or as necessary to provide required functionality to IED 1300. Microprocessors 1302, 1312, 1322, and 1328 may also be intentionally not connected to provide, e.g., increased device security and resistance to computer hacking, or for performance, auditing, or certification purposes. The microprocessors of FIGS. 12 and 13 may or may not be dedicated to a particular task, e.g., energy monitoring, depending on the needs of any particular IED 1300. A power supply or supplies, not shown, provide power for the one or more microprocessors. It will be appreciated that other architectures may also be used, such as those disclosed in U.S. Pat. No. 5,136,457, which is incorporated herein by reference.

According to various embodiments, various metering sensors, e.g., any device capable of sensing electrical energy and providing corresponding electrical signals, may be used in combination with an IED or IEDs disclosed herein. Metering sensors may be mounted within and forming a part of an IED, or may be separate devices mounted away from the IED, mounted on the IED, or a combination of both. It will be appreciated that a myriad of current and future sensors may be operated in combination with the IED(s) and the systems and methods described herein.

While the invention has been described and illustrated in connection with illustrative embodiments, many variations and modifications as will be evident to those skilled in this art may be made without departing from the scope of the invention as defined by the claims, and the invention is thus not to be limited to the precise details of methodology or construction set forth above as such variations and modifications are intended to be included within the scope of the invention as defined by the claims.

In other words, the present invention has been illustrated and described with respect to specific embodiments thereof, which embodiments are merely illustrative of the principles of some embodiments of the invention and are not intended to be exclusive or otherwise limiting embodiments. Accordingly, although the above description of illustrative embodiments of the present invention, as well as various illustrative modifications and features thereof, provides many specificities, these enabling details should not be construed as limiting the scope of the invention, and it will be readily understood by those persons skilled in the art that the present invention is susceptible to many modifications, adaptations, variations, omissions, additions, and equivalent implementations without departing from this scope and without diminishing its attendant advantages. For instance, except to the extent necessary or inherent in the processes themselves, no particular order to steps or stages of methods or processes described in this disclosure, including the figures, is implied. In many cases the order of process steps may be varied, and various illustrative steps may be combined, altered, or omitted, without changing the purpose, effect or import of the methods described. Similarly, the structure and/or function of a component may be combined into a single component or divided among two or more components. It is further noted that the terms and expressions have been used as terms of description and not terms of limitation. There is no intention to use the terms or expressions to exclude any equivalents of features shown and described or portions thereof. Additionally, the present invention may be practiced without necessarily providing one or more of the advantages described herein or otherwise understood in view of the disclosure and/or that may be realized in some embodiments thereof. It is therefore intended that the present invention is not limited to the disclosed embodiments but should be defined in accordance with claims that are based on the present disclosure, as such claims may be presented herein and/or in any patent applications claiming priority to, based on, and/or corresponding to the present disclosure.

What is claimed is:

1. A method of facilitating enabling a software component on a device, the software component comprising application program code executable on the device, said method being implemented by a computer system comprising one or more processors operable in executing program code stored on at least one non-transitory computer-readable medium to cause the computer system to perform the method comprising:

the computer system receiving a download request for the software component and an identifier uniquely associated with the device for which the software component is requested;

the computer system ascertaining based on a software inventory for the device whether the application program code of the software component is pre-installed on the device but not enabled for execution by the device; and wherein, (i) in the event that the computer system ascertains that the application program code of the software component is pre-installed on the device but not enabled for execution by the device, the computer system causes information for enabling the pre-installed application program code of the software component for execution by the device to be communicated to the device, and (ii) in the event that the computer system ascertains that the application program code of the software component is not pre-installed on the device, the computer system causes the application program code of the software component to be downloaded for enablement on the device.

2. The method according to claim 1, wherein the software inventory is cloud-based.

3. The method according to claim 1, wherein the software inventory is stored on the device, and the computer system ascertains whether the application program code of the software component is pre-installed on the device but not enabled for execution by the device based on a message received from an intermediary device that accesses the device-stored software inventory.

4. The method according to claim 3, wherein the message received from the intermediary device includes the software inventory, the method further comprising the computer system causing the received software inventory to be stored in a non-transitory storage medium that the computing system can access without communicating with the intermediary device.

5. The method according to claim 3, wherein the message received from the intermediary device does not include the software inventory.

6. The method according to claim 1, wherein the download request is received from an intermediary device that is configured to (i) permit a user to browse and select software components for downloading to and executing by the device, and (ii) selectively communicate with the device, and wherein:

in the event that the computer system causes information for enabling the application program code of the software component for execution by the device to be communicated to the device, the intermediary device is operable in (a) receiving from the computing system a message comprising the information, and (b) communicating the information to the device; and in the event that the computer system causes the application program code of the software component to be downloaded for enablement on the device, the intermediary device is operable in (a) receiving from the computing system a communication comprising the application program code of the software component, and (b) causing the application program code of the software component to be installed on the device.

7. The method according to claim 6, wherein (a) the device is a circuit breaker device that comprises a circuit breaker maintenance tool and is configured to selectively provide one or more of selectively executable protection, counting, diagnosis, maintenance, and alarming functions, (b) the software component is an application module that when executed by the circuit breaker maintenance tool causes the circuit breaker device to implement one or more of the selectively executable protection, counting, diagnosis, maintenance, and alarming functions, and/or one or more selectively executable circuit protection functions.

8. The method according to claim 7, wherein the circuit breaker device that comprises a circuit breaker maintenance tool is configured to selectively provide a plurality of selectively executable protection, counting, diagnosis, maintenance, and alarming functions.

9. The method according to claim 7, wherein the software component is an application module that when executed by the circuit breaker maintenance tool causes the circuit breaker device to implement a plurality of the protection, counting, diagnosis, maintenance, and alarming functions.

10. The method according to claim 7, wherein the circuit breaker device comprises: at least one processor that is operable to selectively execute the software component; and a communication module that is operable to selectively communicate with at least the intermediary device.

11. The method according to claim 10, wherein (a) the computing system is under the ownership and control of a first party, and (b) the intermediary device and the circuit breaker device are located at a premises of a customer or subscriber of the first party.

12. The method according to claim 11, wherein the first party is a supplier or manufacturer of the circuit breaker device.

13. The method according to claim 12, wherein the first party generates and/or updates a cloud-based software inventory for the device upon providing the device to the customer or subscriber, wherein the cloud-based software inventory is generated or updated such that it includes information identifying all software components of the device as provided to the customer or subscriber.

14. The method according to claim 13, wherein the software inventory includes information indicating whether each software component installed on the device is enabled.

15. The method according to claim 1, further comprising the computing system determining based on the unique identifier whether the software inventory for the device is stored in a non-transitory storage medium of the computing system, and wherein:
in the event that the software inventory for the device is not stored in the non-transitory storage medium of the computing system, the computing system (i) causing an intermediary device communicably coupled to the device to provide the computing system with the software inventory for the device, and (ii) causing the software inventory for the device to be stored in the non-transitory storage medium of the computing system, wherein the software inventory is updated to include the software component caused to be enabled in response to the download request; and
in the event that the software inventory for the device is stored in the non-transitory storage medium of the computing system, the computing system causing the software inventory of the computing system to be updated to include the software component caused to be enabled in response to the download request.

16. The method according to claim 15, wherein the non-transitory storage medium of the computing system is cloud-based.

17. The method according to claim 16 further comprising the computing system causing a second software component to be enabled on the device when causing the software component to be enabled on the device, wherein functionality and/or data associated with the software component is accessible to a user without requiring authentication of the user, and neither functionality nor any data associated with the second software component is accessible to a user without authentication of the user.

18. The method according to claim 17, wherein the functionality and any data associated with the second software component is selectively accessible to an entity having credentials that can be authenticated by the device and/or by an intermediary device that is communicably coupled to the device.

19. A method of facilitating access to at least one software component on a device, said method being implemented by a computer system comprising one or more processors operable in executing program code stored on at least one non-transitory computer-readable medium to cause the computer system to perform the method comprising:
the computer system receiving a request for access to at least one software component from a requestor, and receiving a type identifier associated with the requestor type;
the computer system ascertaining based on the type identifier whether a requestor is a user or service provider; and
wherein, (i) in the event that the computer system ascertains that the requestor is a user, the computer system granting the user access to software components purchased by the user for use on the device and preventing user access to pre-installed software components not purchased by the user, and (ii) in the event that the computer system ascertains that the requestor is a service provider, the computer system granting the service provider access to all software components on the device, including pre-installed software components not purchased by the user.

20. The method according to claim 19, wherein in the event that the computer system ascertains that the requestor is a service provider, facilitating the execution of additional software components for use by the service provider.

21. The method according to claim 19, wherein in the event that the computer system ascertains that the requestor is a service provider, installing additional software components for use by the service provider.

22. The method according to claim 19, wherein in the event that the computer system ascertains that the requestor is a service provider, granting access to a historical archive of data from all software components on the device.

23. The method according to claim 19, wherein the computer system assembles data from the software components not accessible to the user.

24. The method according to claim 23, wherein the computer system provides the user access to the assembled data through an internet portal.

25. The method according to claim 23, wherein the computer system provides the user access to the assembled data through a mobile application.

26. The method according to claim 23, wherein computer system provides the user access to the assembled data through a reporting tool.

27. A system comprising at least one processor and at least one non-transitory computer-readable medium storing thereon computer code that, when executed by the at least one processor, causes the system to implement a method of facilitating enabling a software component on a device, the software component comprising application program code executable on the device, the method comprising:

the system receiving a download request for the software component and an identifier uniquely associated with the device for which the software component is requested;

the system ascertaining based on a software inventory for the device whether the application program code of the software component is pre-installed on the device but not enabled for execution by the device; and wherein, (i) in the event that the system ascertains that the application program code of the software component is pre-installed on the device but not enabled for execution by the device, the system causes information for enabling the pre-installed application program code of the software component for execution by the device to be communicated to the device, and (ii) in the event that the system ascertains that the application program code of the software component is not pre-installed on the device, the system causes the application program code of the software component to be downloaded for enablement on the device.

28. The system according to claim 27, wherein the download request is received from an intermediary device that is configured to (i) permit a user to browse and select software components for downloading to and executing by the device, and (ii) selectively communicate with the device, and wherein:

in the event that the system causes information for enabling the application program code of the software component for execution by the device to be communicated to the device, the intermediary device is operable in (a) receiving from the system a message comprising the information, and (b) communicating the information to the device; and in the event that the system causes the application program code of the software component to be downloaded for enablement on the device, the intermediary device is operable in (a) receiving from the system a communication comprising the application program code of the software component, and (b) causing the application program code of the software component to be installed on the device.

29. The system according to claim 28, wherein (a) the device is a circuit breaker device that comprises a circuit breaker maintenance tool and is configured to selectively provide one or more of selectively executable protection, counting, diagnosis, maintenance, and alarming functions, and (b) the software component is an application module that when executed by the circuit breaker maintenance tool causes the circuit breaker device to implement one or more of the selectively executable protection, counting, diagnosis, maintenance, and alarming functions, and/or one or more selectively executable circuit protection functions.

30. At least one non-transitory computer-readable medium comprising code that, when executed by at least one processor, is operative to cause the at least one processor execute the method according to claim 1.

31. A system comprising at least one processor and at least one non-transitory computer-readable medium storing thereon computer code that, when executed by the at least one processor, causes the system to implement a method of facilitating access to at least one software component on a device, the method comprising:

the system receiving a request for access to at least one software component from a requestor, and receiving a type identifier associated with the requestor type;

the system ascertaining based on the type identifier whether a requestor is a user or service provider; and wherein, (i) in the event that the system ascertains that the requestor is a user, the system granting the user access to software components purchased by the user for use on the device and preventing user access to pre-installed software components not purchased by the user, and (ii) in the event that the system ascertains that the requestor is a service provider, the system granting the service provider access to all software components on the device, including pre-installed software components not purchased by the user.

32. At least one non-transitory computer-readable medium comprising code that, when executed by at least one processor, is operative to cause the at least one processor execute the method according to claim 19.

* * * * *